United States Patent
Ono

(10) Patent No.: US 10,924,341 B2
(45) Date of Patent: Feb. 16, 2021

(54) COMMUNICATION DEVICE, COMMUNICATION METHOD AND COMMUNICATION SYSTEM

(71) Applicant: FUJITSU LIMITED, Kawasaki (JP)

(72) Inventor: Masayuki Ono, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/249,398

(22) Filed: Jan. 16, 2019

(65) Prior Publication Data
US 2019/0238406 A1 Aug. 1, 2019

(30) Foreign Application Priority Data
Jan. 29, 2018 (JP) .............................. JP2018-012249

(51) Int. Cl.
*H04L 12/24* (2006.01)
*H04L 12/26* (2006.01)

(52) U.S. Cl.
CPC ...... *H04L 41/0813* (2013.01); *H04L 41/0681* (2013.01); *H04L 43/10* (2013.01); *H04L 43/0811* (2013.01)

(58) Field of Classification Search
CPC . H04L 41/0813; H04L 41/0681; H04L 43/10; H04L 43/0811
See application file for complete search history.

(56) References Cited

U.S. PATENT DOCUMENTS

| | | | | |
|---|---|---|---|---|
| 8,224,946 | B2* | 7/2012 | Allan | H04L 12/2881 |
| | | | | 709/223 |
| 2015/0263991 | A1* | 9/2015 | Macchiano | H04L 43/0811 |
| | | | | 370/400 |
| 2015/0288620 | A1 | 10/2015 | Yasuda | |
| 2015/0312121 | A1 | 10/2015 | Yasuda et al. | |
| 2016/0156516 | A1* | 6/2016 | Nishi | H04L 43/0829 |
| | | | | 370/329 |
| 2017/0078193 | A1* | 3/2017 | Cui | H04L 12/6418 |

FOREIGN PATENT DOCUMENTS

| | | |
|---|---|---|
| JP | 2015-201751 | 11/2015 |
| JP | 2015-211402 | 11/2015 |

* cited by examiner

*Primary Examiner* — Sm A Rahman
(74) *Attorney, Agent, or Firm* — Fujitsu Patent Center

(57) ABSTRACT

A device includes a first port in which a first address as a monitoring point is set and which is connected to one communication line belonging to a link aggregation group to which another communication line for another device also belongs, and a processor configured to transmit and receive a monitoring frame based on the first address through the first port, switch an operating state of the first port to an active state or a standby state, and restrict the transmission and the reception of the monitoring frame through the first port when the operating state of the first port is switched to the standby state, wherein the first address is identical to a second address which is set as a monitoring point in a second port of the other device connected to the other communication line belonging to the link aggregation group to which the one communication line belongs.

7 Claims, 9 Drawing Sheets

FIG. 3

| SETTINGS OF MEP #31 ||
|---|---|
| MAC ADDRESS | X |
| ENABLE/DISABLE TRANSMISSION | ENABLE |
| ENABLE/DISABLE RECEPTION | ENABLE |
| ENABLE/DISABLE ALARM OUTPUT | ENABLE |

| SETTINGS OF MEP #32 ||
|---|---|
| MAC ADDRESS | X |
| ENABLE/DISABLE TRANSMISSION | DISABLE |
| ENABLE/DISABLE RECEPTION | ENABLE |
| ENABLE/DISABLE ALARM OUTPUT | DISABLE |

COMMUNICATION DEVICE, COMMUNICATION METHOD AND COMMUNICATION SYSTEM

CROSS-REFERENCE TO RELATED APPLICATION

This application is based upon and claims the benefit of priority of the prior Japanese Patent Application No. 2018-12249, filed on Jan. 29, 2018, the entire contents of which are incorporated herein by reference.

FIELD

The embodiment discussed herein is related to a communication device and a communication system.

BACKGROUND

As a technique in which a plurality of physical links (physical communication lines) connecting the communication devices to each other are bundled together so as to be treated as a single logical link, link aggregation (LAG) based on the link aggregation control protocol (LACP) is known. With the LAG, a plurality of links are able to become redundant. Thus, even when a failure is generated in an active link, it is possible to continue communication through a standby link. The LAG is defined in, for example, the Institute of Electrical and Electronics Engineers (IEEE) standards 802.3ad.

Furthermore, as a technique that realizes the LAG across the links of a plurality of communication devices, multi-chassis (MC)-LAG is known (see, for example, Japanese Laid-open Patent Publication Nos. 2015-211402 and 2015-201751). With the MC-LAG, the plurality of communication devices transmit/receive distributed relay control protocol (DRCP) frames to/from one another, thereby being treated as a single device by another device.

The communication devices are each provided with, for example, a maintenance end point (MEP) as a point where operations, administrations, and maintenance (OAM) functions terminate. The communication devices are able to monitor communication paths therebetween by transmitting/receiving the OAM frames such as continuity check message (CCM) frames, which is used to check the connectivity, between the MEPs. The MEPs are defined in, for example, the International Telecommunication Union Telecommunication Standardization Sector (ITU-T) recommendation Y.1731. As related art, for example, Japanese Laid-open Patent Publication Nos. 2015-211402, 2015-201751, and so forth are disclosed.

With the MC-LAG, when a link failure is generated, operating states of ports of the communication devices included in the MC-LAG are switched to an active state or a standby state, thereby the communication path is switched. In a network where groups of communication devices included in MC-LAGs are connected in a multiple-stage form, the operating states of the ports are switched in accordance with the operating states of the communication devices when the link failure is generated.

Accordingly, a communication path after the switching is not identified. Thus, the MEP on the communication path after the switching out of the MEPs of the communication devices included in the MC-LAG of the last stage, for example, the MEP that monitors the communication path after the switching is not able to be identified. Here, since different media access control (MAC) addresses are set in different MEPs in advance, the CCM frames do not necessarily reach the MEP on the communication path after the switching depending on the communication path. In this case, this MEP falsely detects, for example, an alarm for the absence of the reception of the CCM frames (for example, a loss of continuity (LOC)).

In contrast, when the communication devices included in the MC-LAG of the last stage appropriately change an address setting of the MEP in accordance with the communication path after the switching, the CCM frames are able to reach the MEP on this communication path.

However, changing the address setting of the MEP requires, for example, various types of complex processing using the software. Accordingly, a long time is required until the CCM frames are able to be transmitted/received by the MEP on the communication path after the switching. Consequently, alarms such as LOCs may be falsely detected until monitoring of the communication path is restarted. Accordingly, for example, a measure such as stopping of detection of all the alarms is required until changing of the address setting of the MEP is completed. Thus, a long time may be required to restart the monitoring of the communication path.

In view of the above-described situation, it is desirable to provide a communication device and a communication system that allow monitoring of a communication path to be quickly restarted when the communication path is switched.

SUMMARY

According to an aspect of the embodiments, a communication device includes a first port in which a first address as a monitoring point is set and which is connected to one communication line belonging to a link aggregation group to which another communication line for another device also belongs, and a processor configured to transmit and receive a monitoring frame based on the first address through the first port, switch an operating state of the first port to an active state or a standby state, and restrict the transmission and the reception of the monitoring frame through the first port when the operating state of the first port is switched to the standby state, wherein the first address is identical to a second address which is set as a monitoring point in a second port of the other device connected to the other communication line belonging to the link aggregation group to which the one communication line belongs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates examples of settings of MEPs;

DESCRIPTION OF EMBODIMENTS

Figure 1:
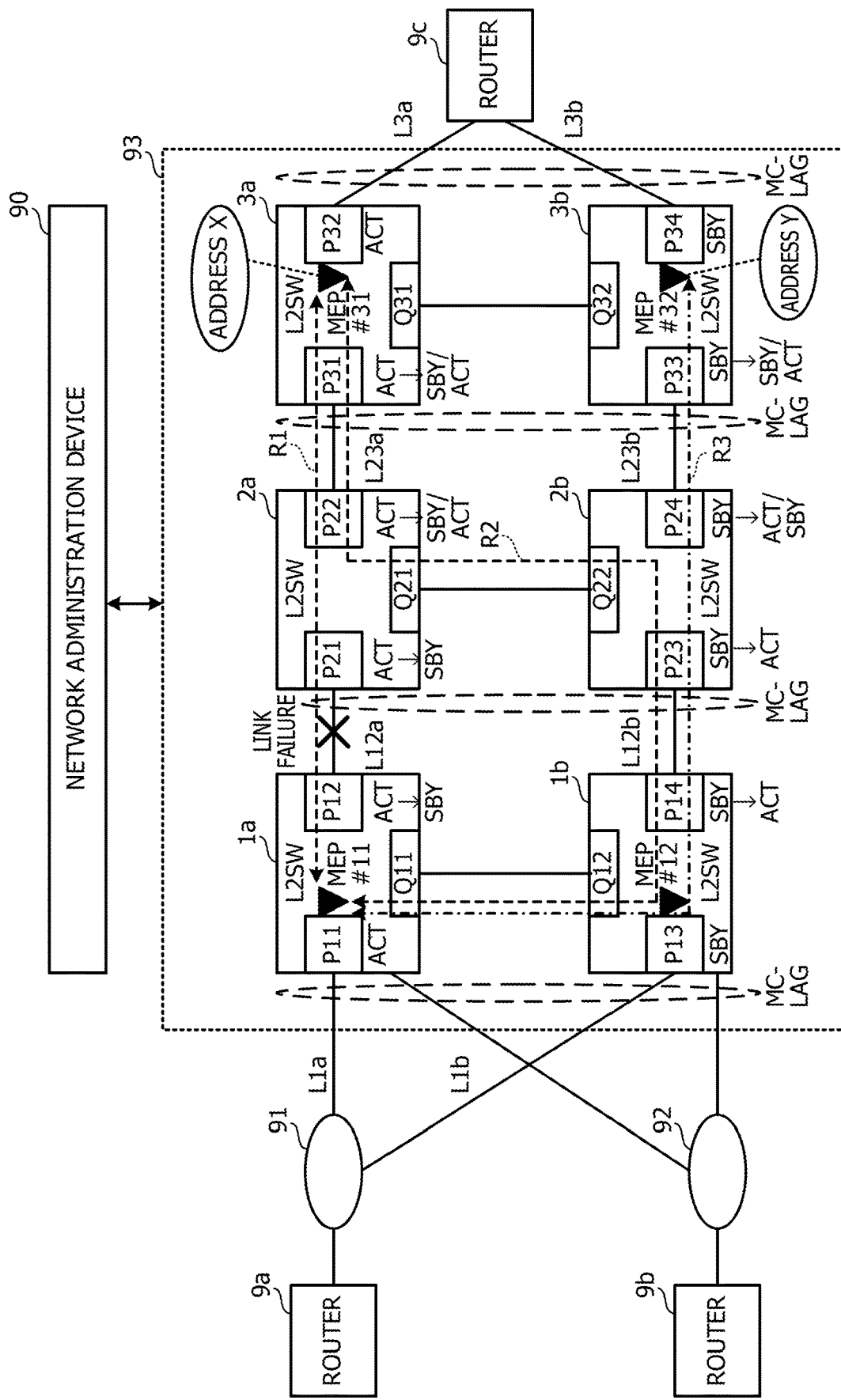
FIG. 1 illustrates a configuration of a transmission system according to a comparative example.

FIG. 1 illustrates a configuration of a transmission system according to a comparative example. The transmission system includes a network administration device 90, access networks 91 and 92, a relay network 93, and routers 9a to 9c.

The routers 9a, 9b are provided in, for example, homes of users, and the router 9c is provided in, for example, a relay station. The routers 9a, 9c transmit frames to and receive frames from each other through the access network 91 and the relay network 93. The routers 9b, 9c transmit frames to and receive frames from each other through the access network 92 and the relay network 93. Although examples of the frames include, for example, Ethernet (registered trademark, the same applies hereafter) frames and Internet protocol (IP) frames, this is not limiting.

The relay network 93 includes a plurality of layer 2 switches 1a to 3a, 1b to 3b as examples of communication devices. The layer 2 switches 1a to 3a, 1b to 3b are arranged in separate three stages. The layer 2 switches 1a, 1b are disposed at a first stage, the layer 2 switches 2a, 2b are disposed at a second stage, and the layer 2 switches 3a, 3b are disposed at a third stage. The configuration including the layer 2 switches 3a, 3b is an example of a communication system.

The layer 2 switch 1a has ports P11, P12, Q11, and the layer 2 switch 1b has ports P13, P14, Q12. The ports P11, P13 are connected to the access network 91, and the ports Q11, Q12 are connected to each other. The layer 2 switches 1a, 1b communicate with each other by, for example, transmitting and receiving database resident connection pooling (DRCP) frames through the ports Q11, Q12.

A communication line L1a between the port P11 and the access network 91 and a communication line L1b between the port P13 and the access network 91 are set so as to belong to a common multi-chassis link aggregation (MC-LAG) group. The access network 92 is connected to ports (not illustrated) of the layer 2 switches 1a and 1b.

The ports P12, P14 are respectively connected to a port P21 of the layer 2 switch 2a and a port P23 of the layer 2 switch 2b. A communication line L12a between the port P12 and the port P21 and a communication line L12b between the port P14 and the port P23 are set so as to belong to a common MC-LAG group.

The layer 2 switch 2a has the ports P21, P22, Q21, and the layer 2 switch 2b has the ports P23, P24, Q22. The ports P21, P23 are respectively connected to the port P12 of the layer 2 switch 1a and a port P14 of the layer 2 switch 1b. The ports Q21 and Q22 are connected to each other. The layer 2 switches 2a, 2b communicate with each other by, for example, transmitting and receiving the DRCP frames through the ports Q21, Q22.

The ports P22, P24 are respectively connected to a port P31 of the layer 2 switch 3a and a port P33 of the layer 2 switch 3b. A communication line L23a between the port P22 and the port P31 and a communication line L23b between the port P24 and the port P33 are set so as to belong to a common MC-LAG group.

The layer 2 switch 3a has the ports P31, P32, Q31, and the layer 2 switch 3b has the ports P33, P34, Q32. The ports P31, P33 are respectively connected to the port P22 of the layer 2 switch 2a and the port P24 of the layer 2 switch 2b. The ports Q31 and Q32 are connected to each other.

The layer 2 switches 3a, 3b communicate with each other by, for example, transmitting and receiving the DRCP frames through the ports Q31, Q32. The layer 2 switches 3a, 3b are examples of a first communication device and a second communication device and respectively perform communication through the communication lines L23a, L23b belonging to the same MC-LAG group.

The ports P32, P34 are connected to the router 9c. A communication line L3a between the port P32 and the router 9c and a communication line L3b between the port P34 and the router 9c are set so as to belong to a common MC-LAG group. Here, the port P31 of the layer 2 switch 3a and the port P33 of the layer 2 switch 3b are examples of a first port and a second port and connected to the communication lines L23a and L23b belonging to the same MC-LAG group.

Operating states of pairs of the ports P11 to P14, P21 to P24, P31 to P34 connected to the communication lines L1a, L1b, L12a, L12b, L23a, L23b, L3a, L3b belonging to the common MC-LAG groups are such that, in each of the pairs of the ports, one of the ports is an active (ACT) state and the other port is the standby (SBY) state. When the operating state is the active state, frame transmission is possible. When the operating state is the standby state, the frame transmission is impossible.

For example, when the operating state of the port P11 is the active state and the operating state of the port P13 is the standby state, only the port P11 in the active state is able to transmit frames to the access network 91. When the operating state of the port P32 is the active state and the operating state of the port P34 is the standby state, only the port P32 in the active state is able to transmit frames to the router 9c.

The MC-LAG groups are examples of the link aggregation group. In this example, the ports P11 to P14, P21 to P24, P31 to P34 of the layer 2 switches 1a, 1b, 2a, 2b, 3a, 3b belong to the MC-LAG groups such that the ports of two layer 2 switches belongs to a single MC-LAG group. However, ports of three or more layer 2 switches may belong to a single MC-LAG group.

When the routers 9a and 9c communicate with each other, for example, frames are transmitted and received along a communication path R1. Examples of the frames include, for example, user frames including user data and operations, administrations, and maintenance (OAM) frames including information on the OAM. The OAM frames are examples of first and second monitoring frames for monitoring communication paths R1 to R3. The communication paths R1 to R3 are common to the user frames and the OAM frames. Although the transmission system has the OAM functions compliant with, for example, the International Telecommunication Union Telecommunication Standardization Sector (ITU-T) recommendation Y.1731 in this example, this is not limiting. The OAM frames include continuity check message (CCM) frames.

The communication path R1 includes the communication lines L12a and L23a. Accordingly, the operating states of the ports P12, P21 connected to the communication line L12a and the ports P22, P31 connected to the communication line L23a are the active state. For example, when transmitting the frames from the router 9a to router 9c, the layer 2 switch 1a transmits the frames received through the port P11 to the layer 2 switch 2a through the port P12.

The layer 2 switch 2a transmits the frames received through the port P21 to the layer 2 switch 3a through the port P22. The layer 2 switch 3a transmits the frames received through the port P31 to the router 9c through the port P32. In the transmission direction from the router 9c to the router 9a, the layer 2 switches 1a to 3a transfer the frames in an opposite procedure to the above-described procedure. Thus, the routers 9a and 9c communicate with each other.

In the relay network 93, pairs of the layer 2 switches 1a, 1b, 2a, 2b, 3a, 3b included in the common MC-LAGs are connected in a multiple-stage form. Maintenance end points MEPs #11, #12, #31, #32 for performing the OAM functions for communication in the relay network 93 are set in the pair of the layer 2 switches 1a, 1b of a first stage and the pair of the layer 2 switches 3a, 3b of a last stage.

The MEPs #11, #12, #31, #32 monitor the communication paths R1 to R3 between the MEPs #11, #12, #31, #32 and the layer 2 switches 1a, 1b, 3a, 3b as the destinations of the communication. The MEPs #31, #32 are examples of a first monitoring section and a second monitoring section. The MEPs #11, #12, #31, #32 are respectively provided for the ports P11, P13, P32, P34. Individual media access control (MAC) addresses are set in the MEPs #11, #12, #31, #32 in advance. For example, "X" is set in the MEP #31 for the port P32 as the MAC address (see "address X"), and "Y" is set in the MEP #32 for the port P34 as the MAC address (see "address Y"). The MAC addresses of the MEPs #31, #32 are examples of a first address and a second address.

The MEPs #11, #12, #31, #32 transmit/receive the OAM frames along the communication paths R1 to R3 so as to monitor the communication paths R1 to R3. The MAC addresses of the MEPs #11, #12, #31, #32 being destinations of the OAM frames are provided in the OAM frames. The layer 2 switches 1a to 3a and 1b to 3b transfer the OAM frames to the other layer 2 switches 1a to 3a and 1b to 3b through the ports P12, P14, P21 to P24, P31, P33, Q11, Q12, Q21, Q22, Q31, and Q32 in accordance with the MAC addresses of destinations of the OAM frames. Thus, the MEPs #11, #12, #31, #32 transmit/receive the OAM frames in accordance with the MAC addresses of the destinations.

The communication path R1 is monitored by the MEPs #11, #31 of the layer 2 switches 1a, 3a at both ends of the communication path R1. For example, the MEPs #11, #31 transmit/receive the CCM frames to/from each other at a fixed frequency so as to monitor the communication path R1. For example, when one of the MEPs #11, #31 are not able to receive the CCM frames from the other of the MEPs #11, #31 within the fixed frequency, the number of times of the absence of the reception is counted. When this count reaches a predetermined value, a loss of continuity (LOC) alarm is detected. The layer 2 switches 1a, 3a notify the network administration device 90 of the LOC.

The network administration device 90 is, for example, a server and administers the relay network 93. When the layer 2 switches 1a to 3a, 1b to 3b notify of an alarm, the network administration device 90 notifies an administrator of the relay network 93 of the notification of the alarm.

The layer 2 switches 1a to 3a and 1b to 3b monitor the states of the communication lines L1a, L1b, L12a, L12b, L23a, L23b, L3a, L3b, and when, for example, signal light of a frame to be received is not able to be detected, a link failure is detected. For example, when the link failure is generated in the communication line L12a (see an x mark), the layer 2 switches 1a, 2a notify not only the network administration device 90 but also the other layer 2 switches 1b, 2b, 3a, 3b of information on the link failure.

This causes the operating state or the operating states of a subset of the ports P11 to P14, P21 to P24, P31 to P34 to be switched from the active state to the standby state or the standby state to the active state. Switching of the operating state or the operating states of a subset of the ports P11 to P14, P21 to P24, P31 to P34 causes the communication path R1 to be switched to, for example, one of the other communication paths R2, R3 with which the communication line L12a where the link failure is generated is bypassed.

Whether the communication path R1 is switched to the communication path R2 or R3 is determined depending on the states of the layer 2 switches 1a to 3a, 1b to 3b at the time when the link failure is generated. Accordingly, the user is not able to specify the communication paths R2 or R3 as the communication path after the switching. The communication paths R2, R3 are examples of a first communication path and a second communication path.

The communication path R2 includes the communication lines L12b and L23a. Accordingly, when the communication path is switched to the communication path R2, the operating states of the ports P14, P23 connected to the communication line L12b and the ports P22, P31 connected to the communication line L23a become the active state.

At this time, for example, when transmitting the frames from the router 9a to router 9c, the layer 2 switch 1a transmits the frames received through the port P11 to the layer 2 switch 2a through the port Q11. The layer 2 switch 1b transmits the frames received through the port Q12 to the layer 2 switch 2b through the port P14.

The layer 2 switch 2b transmits the frames received through the port P23 to the layer 2 switch 2a through the port Q22. The layer 2 switch 2a transmits the frames received through the port Q21 to the layer 2 switch 3a through the port P22. The layer 2 switch 3a transmits the frames received through the port P31 to the router 9c through the port P32.

The communication path R3 includes the communication lines L12b and L23b. Accordingly, when the communication path is switched to the communication path R3, the operating states of the ports P14, P23 connected to the communication line L12b and the ports P24, P33 connected to the communication line L23b become the active state.

At this time, for example, when transmitting the frames from the router 9a to router 9c, the layer 2 switch 1a transmits the frames received through the port P11 to the layer 2 switch 2a through the port Q11. The layer 2 switch 1b transmits the frames received through the port Q12 to the layer 2 switch 2b through the port P14.

The layer 2 switch 2b transmits the frames received through the port P23 to the layer 2 switch 3b through the port P24. The layer 2 switch 3b transmits the frames received through the port P33 to the router 9c through the port P34.

For example, when the communication path is switched to the communication path R2 because of the generation of a link failure, the MEP #31 on the communication path R1 before the switching is the same as the MEP #31 on the communication path R2 after the switching. Thus, as in the case where the communication path R1 is monitored, the MEP #31 transmits/receives the OAM frames along the communication path R2 so as to be able to monitor the communication path R2.

Meanwhile, when the communication path is switched to the communication path R3 because of the generation of a link failure, the MEP #31 on the communication path R1 before the switching is different from the MEP #32 on the communication path R3 after the switching. Thus, the MEP #32 is not able to receive the OAM frames along the communication path R3. Consequently, the CCM frames do not reach the MEP #32. This may cause the LOC to be falsely detected by the MEP #32.

In contrast, when the layer 2 switch 3a, 3b included in the MC-LAG of the last stage appropriately changes address settings of the MEP #31, #32 in accordance with the communication path R2, R3 after the switching, the CCM frames are able to reach the MEP #31, #32 on the communication path R2, R3. For example, in the case where the communication path is switched to the communication path R3, when the layer 2 switch 3b changes the MAC address of the MEP #32 to "X", and the layer 2 switch 3a changes the MAC address of the MEP #32 to "Y", the CCM frames reach the MEP #32 in accordance with the MAC address "X" of the destination.

However, changing the address settings of the MEPs #31, #32 requires, for example, various types of complex processing using the software. Accordingly, a long time is required until the CCM frames are able to be transmitted/received by the MEP #32 on the communication path R3 after the switching. Consequently, alarms such as LOCs may be falsely detected until monitoring of the communication path R3 is restarted. Accordingly, for example, a measure such as stopping of detection of all the alarms is required until changing of the address settings of the MEPs #31, #32 are completed. Thus, a long time may be required to restart the monitoring of the communication path R3.

Thus, according to the embodiment, in order to allow the MEP #31, #32 to receive the OAM frames regardless of whether the communication path is the communication path R2 or R3 after the switching, a common MAC address is set in the MEPs #31, #32 in advance.

Figure 2:
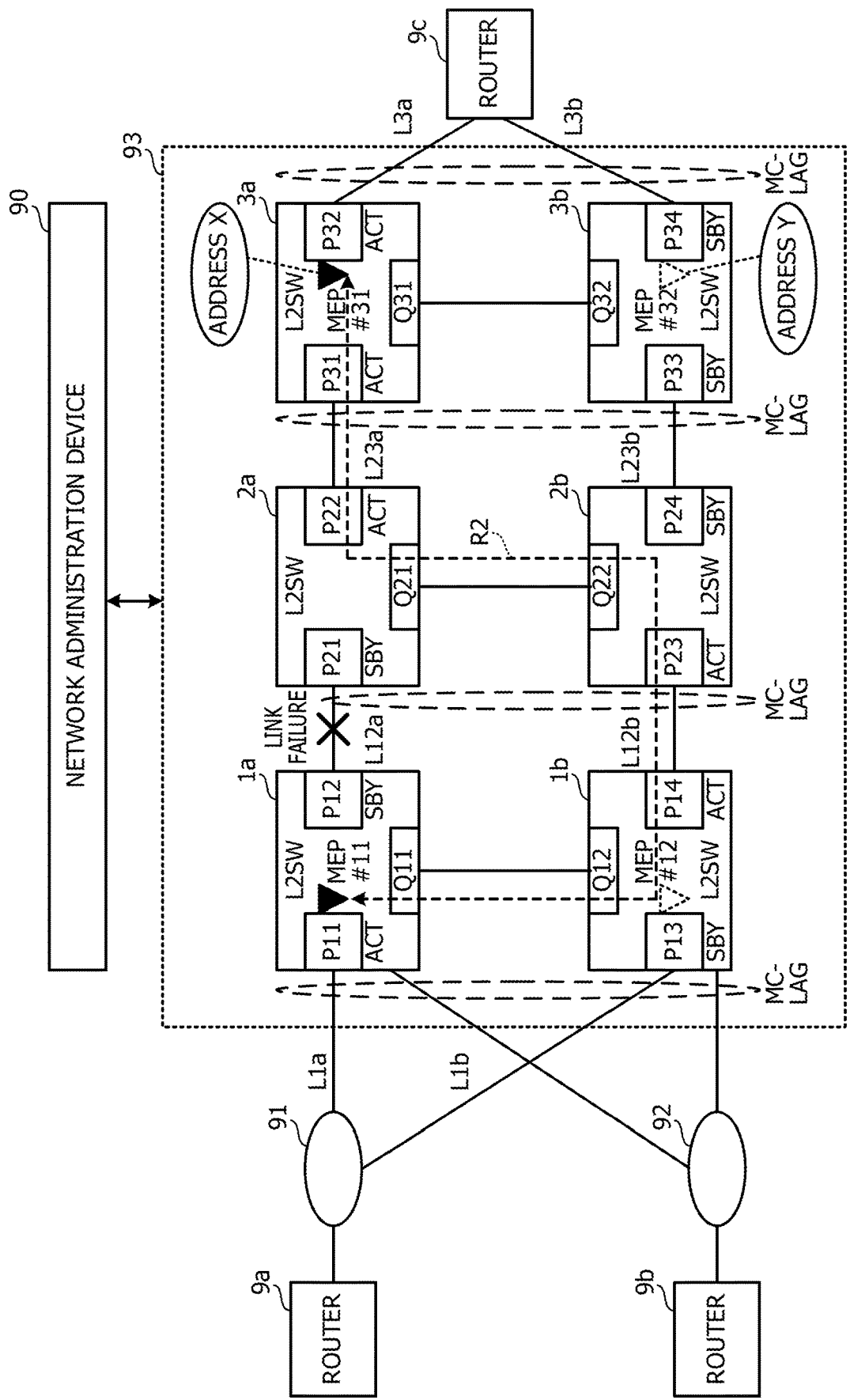
FIG. 2 illustrates a configuration of a transmission system according to an embodiment.

FIG. 2 illustrates a configuration of a transmission system according to the embodiment. In FIG. 2, elements common to FIGS. 1 and 2 are denoted by the same reference signs, thereby description thereof is omitted. FIG. 2 illustrates a case as an example where the communication path is switched to the communication path R2 because of a link failure in the communication line L12a. In this example, the MEPs #12, #32 are not used to monitor the communication path R2 (see dotted lines).

The common MAC address "X" is set in the MEPs #31, #32 in advance. Thus, regardless of whether the communication path is the communication path R2 or R3, the OAM frames are able to be received by both the MEPs #31, #32.

Accordingly, unlike the comparative example, it is not required to change the settings of the MAC addresses of the MEPs #31, #32 after the communication path R1 has been switched to the communication path R2 or R3. Thus, the monitoring of the communication path R2, R3 may be able to be quickly restarted.

Furthermore, since the MEP #32 does not exist on the communication path R2 after the switching, the layer 2 switch 3b restricts the monitoring of the communication path R3 by the MEP #32. For example, the layer 2 switch 3b causes the MEP #32 to stop the transmission of the OAM frames and output of alarms. This may reduce false detection of the LOC because of, for example, the absence of the reception of the CCM frames despite the existence of two MEPs #31, #32 of the common MAC address in the relay network 93.

FIG. 3 illustrates examples of the settings of the MEPs #31, #32. The settings of the MEPs #31, #32 include, for example, the MAC address, enable/disable transmission, enable/disable reception, and enable/disable alarm output. The enable/disable transmission and the enable/disable reception respectively indicate enabling/disabling of transmission of the OAM frames and enabling/disabling of reception of the OAM frames.

The MAC addresses of the MEPs #31, #32 are set to "X" in advance. The MAC addresses are set when, for example, the layer 2 switches 3a, 3b are started up, for example, link establishing processing between the ports Q11, Q12 is performed before the communication between the routers 9a and 9c is started. The enable/disable reception is set when the MEPs #31, #32 are generated.

The enable/disable transmission and the enable/disable alarm output are set in accordance with the communication paths R1 to R3. When the communication path is switched from the communication path R1 to the communication path R2, layer 2 switch 3b changes the enable/disable transmission of the MEP #32 to "disable" and the enable/disable alarm output of the MEP #32 to "disable". This causes the MEP #32 not existing on the communication path R2 to stop the transmission of the OAM frames and the output of the alarms.

Thus, the layer 2 switch 3b restricts the monitoring of the communication path R2 by the MEP #32. When the communication path is switched from the communication path R1 to the communication path R3, the settings of the MEPs #31, #32 are opposite to one another. In this case, the layer 2 switch 3a restricts the monitoring of the communication path R2 by the MEP #31, thereby causing the MEP #31 to stop the transmission of the OAM frames and the output of the alarms.

Referring back to FIG. 2, unlike the comparative example, the layer 2 switches 1a to 3a, 1b to 3b accept settings of the communication paths R1 to R3 from the network administration device 90. This allows the administrator of the relay network 93 to specify the communication paths R1 to R3. The layer 2 switches 1a to 3a, 1b to 3b accept specification of the operating states (ACT/SBY) of the ports P11 to P14, P21 to P24, P31 to P34 in accordance with, for example, the communication lines L1a, L1b, L12a, L12b, L23a, L23b, L3a, L3b with the link failure.

This allows the OAM frames to reach an arbitrary MEP #31, #32. Accordingly, the network administration device 90 may monitor the relay network 93 in both the cases where the communication path is the communication path R2 and where the communication path is the communication path R3.

Next, a configuration the layer 2 switches 1a to 3a, 1b to 3b is described.

Figure 4:
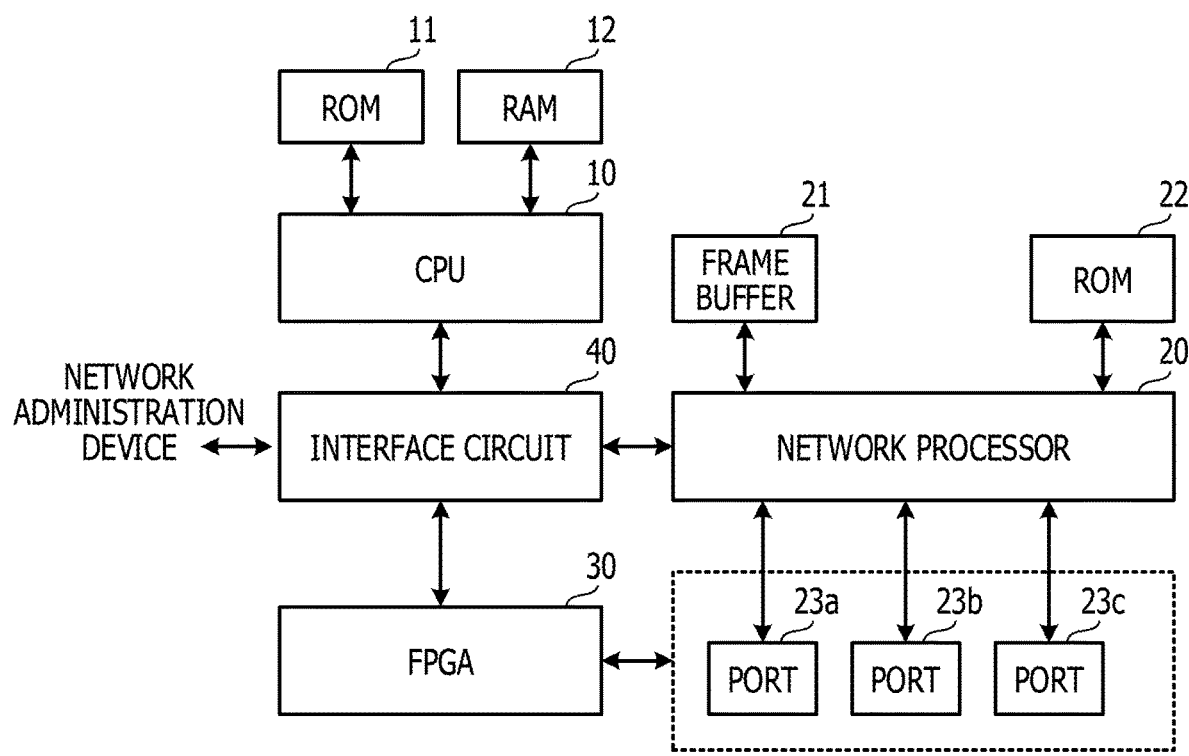
FIG. 4 illustrates an example of a configuration of a layer 2 switch.

FIG. 4 illustrates an example of the configuration of the layer 2 switches 1a to 3a, 1b to 3b. The layer 2 switches 1a to 3a, 1b to 3b each include a central processing unit (CPU) 10, read-only memories (ROM) 11, 22, a random-access memory (RAM) 12, a network processor 20, a frame buffer 21, and a plurality of ports 23a to 23c. Each of the layer 2 switches 1a to 3a, 1b to 3b further includes a field programmable gate array (FPGA) 30 and an interface circuit 40.

The CPU 10 is connected to the ROM 11 and RAM 12. The ROM 11 stores a program that drives the CPU 10. The RAM 12 functions as working memory of the CPU 10. Various functions are formed in the CPU 10 by loading the program from the ROM 11. The CPU 10 controls, for example, the operating states (ACT/SBY) of the ports 23a, 23b.

The network processor 20 is connected to the frame buffer 21, the ROM 22, and the plurality of ports 23a to 23c. The ROM 22 stores a program that drives the network processor 20. Various functions are formed in the network processor 20 by loading the program from the ROM 22.

The ports 23a, 23b correspond to, for example, the ports P31, P32, Q31 of the layer 2 switch 3a or the ports P33, P34, Q32 of the layer 2 switch 3b. The frame buffer 21 includes, for example, memory and stores various types of frames.

The network processor 20 stores in the frame buffer 21 the various types of frames input through the ports 23a to 23c and performs transfer processing of the frames.

The FPGA 30 has various types of monitoring functions. For example, the FPGA 30 monitors the states of the ports 23a to 23c so as to detect the link failure.

The interface circuit 40 includes hardware such as, for example, an application specified integrated circuit (ASIC) and is connected to the CPU 10, the network processor 20, and the FPGA 30. The interface circuit 40 is also connected to the network administration device 90 through a local area network (LAN). The interface circuit 40 relays the communication between the network administration device 90, the CPU 10, the network processor 20, and the FPGA 30.

The CPU 10, the network processor 20, and the FPGA 30 are in conjunction with one another to control the MEP in accordance with the operating states of the ports 23a, 23b. Hereinafter, operations of the layer 2 switches 3a, 3b serving as the examples of the first communication device and the second communication device are described.

Figure 5:
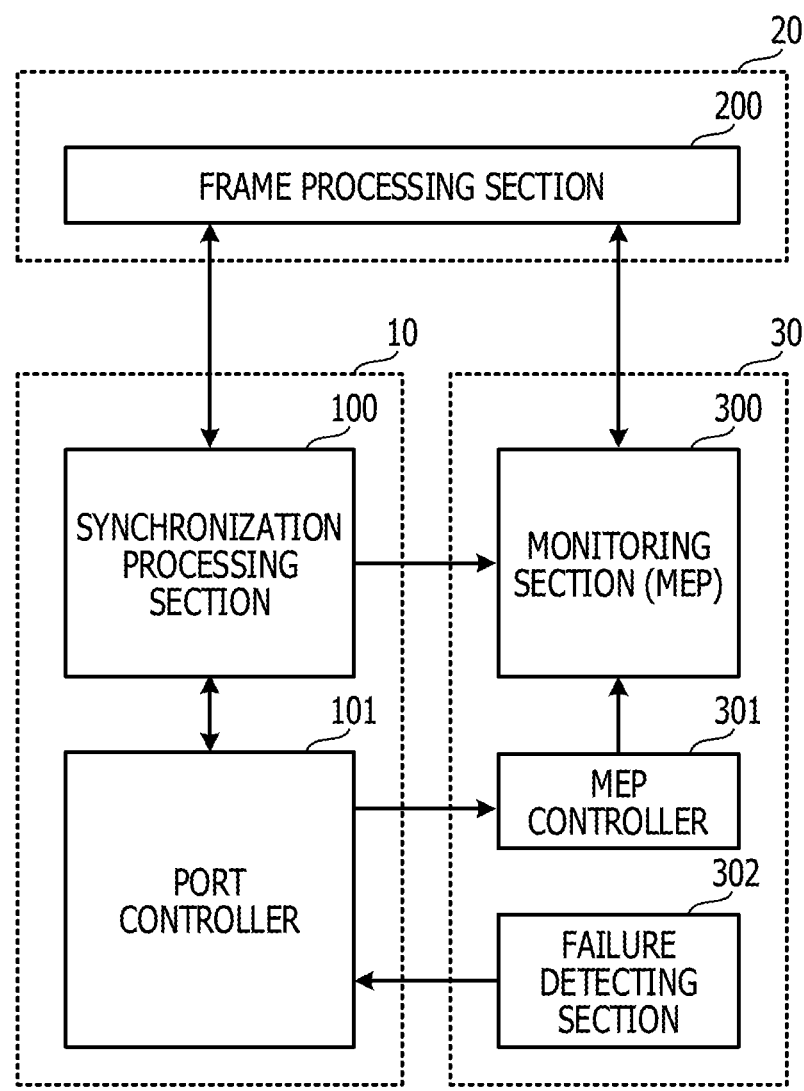
FIG. 5 is a functional configuration view illustrating examples of the functions of the layer 2 switches.

FIG. 5 is a functional configuration view illustrating examples of the functions of each of the layer 2 switches 3a, 3b. A frame processing section 200 is formed in the network processor 20 by the program. A synchronization processing section 100 and a port controller 101 are formed in the CPU 10 by the program.

A monitoring section 300, a MEP controller 301, and a failure detecting section 302 are formed in the FPGA 30 by a logical circuit. Functional sharing between the CPU 10, the network processor 20, the FPGA 30 is not limited. For example, the port controller 101 may be formed in the FPGA 30.

The frame processing section 200 outputs the OAM frames input through the ports 23a, 23b to the monitoring section 300. Furthermore, the frame processing section 200 outputs synchronization frames (for example, DRCP frames) input through the port 23c to the synchronization processing section 100. The monitoring section corresponds to the MEP #31, #32.

The synchronization processing section 100 performs synchronization processing between the layer 2 switches 3a, 3b included in the MC-LAG. At this time, the synchronization processing section 100 of one of the layer 2 switches 3a, 3b communicates with the synchronization processing section 100 of the other of the layer 2 switches 3a, 3b included in the MC-LAG through the port 23c (Q31, Q32).

The synchronization processing section 100 exemplifies a first setting section and a second setting section and sets the MAC address in the monitoring section 300. The monitoring section 300 is provided with memory to hold the settings illustrated in FIG. 3. The synchronization processing section 100 writes the MAC address to this memory. The synchronization processing section 100 performs during startup processing performed in the startup before the start of the communication.

Figure 6:
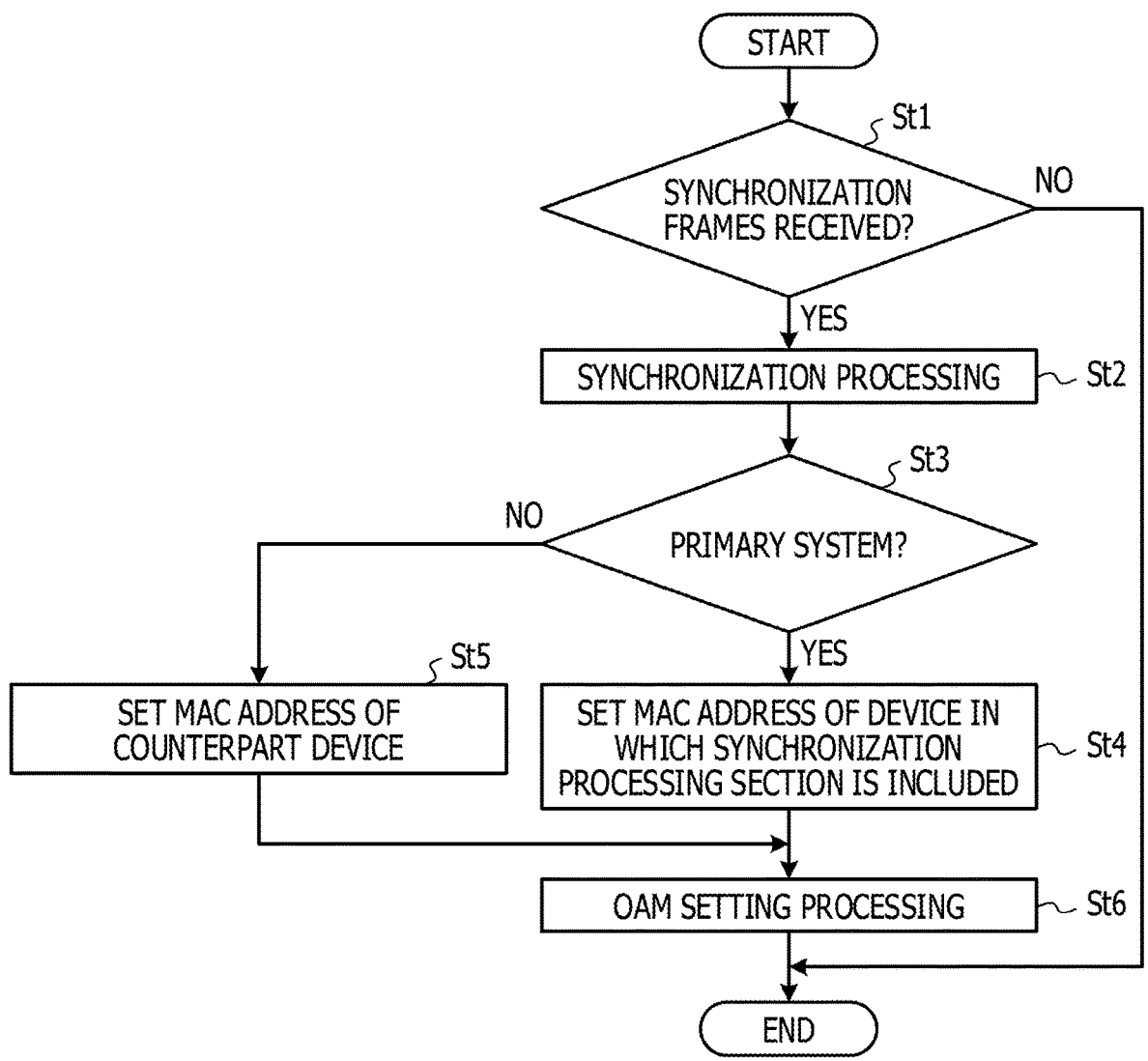
FIG. 6 is a flowchart illustrating an example of startup processing.

FIG. 6 is a flowchart illustrating an example of the startup processing. The synchronization processing section 100 determines whether one of the layer 2 switches 3a, 3b has received the synchronization frames from the other of the layer 2 switches 3a, 3b included in the MC-LAG (step St1). The synchronization processing section 100 ends the processing when the synchronization frames have not been received (No in Step St1).

While receiving the synchronization frames (Yes in step St1), the synchronization processing section 100 performs the synchronization processing between the layer 2 switches 3a, 3b included in the MC-LAG (step St2). When the synchronization processing is performed, which of the layer 2 switches 3a, 3b becomes a primary system and which of the layer 2 switches 3a, 3b becomes a secondary system are determined and the link between the ports Q31, Q32 is established. The layer 2 switch 3a, 3b being the primary system includes the MEP #31, #32 on the communication path R1, R2, R3. For example, in the communication path R1 illustrated in FIG. 1, the layer 2 switch 3a is the primary system and the layer 2 switch 3b is the secondary system.

The synchronization processing section 100 determines whether the device in which the synchronization processing section 100 is included is the primary system or the secondary system (in step St3). When the device in which the synchronization processing section 100 is included is the primary system (Yes in step St3), the synchronization processing section 100 sets the MAC address of the device in which the synchronization processing section 100 is included in the monitoring section 300 (step St4). When the device in which the synchronization processing section 100 is included is the secondary system (No in step St3), the synchronization processing section 100 sets the MAC address of a counterpart device in the monitoring section 300 (step St5). Thus, the MAC address of the layer 2 switch 3a, 3b being the primary system out of the layer 2 switches 3a, 3b included in the MC-LAG is set in common to the layer 2 switches 3a, 3b. The MAC address of the layer 2 switch 3a, 3b is held in advance in, for example, the memory.

As has been described, the synchronization processing section 100 sets in the monitoring section 300 the address held by the device in which the synchronization processing section 100 is included or the other layer 2 switch 3a, 3b in accordance with a result of the communication of one of the layer 2 switches 3a, 3b with the other layer 2 switch 3a, 3b included in the MC-LAG. Thus, the MAC address of the MEPs #31, #32 is the MAC address of one of the layer 2 switches 3a, 3b.

Next, the synchronization processing section 100 performs an OAM setting processing on the monitoring section 300 (step St6). At this time, for example, the synchronization processing section 100 sets in the monitoring section 300 the enable/disable transmission, the enable/disable reception, the enable/disable alarm output, and the MAC address used for the OAM frames. Thus, the startup processing is performed.

Referring back to FIG. 5, the port controller 101, which exemplifies a first switching section and a second switching section, switches the operating state of the port P31, P33 to the active state or to the standby state. The port controller 101 switches the operating state of the port P31, P33 in accordance with whether the device in which the synchronization processing section 100 is included is the primary system or the secondary system as a result of the synchronization processing performed by the synchronization processing section 100 when the layer 2 switch 3a, 3b is started up.

Furthermore, the port controller 101 switches the operating state of the port P31, P33 based on, for example, the settings from the network administration device 90 when the link failure is generated. The failure detecting section 302 obtains failure information from the ports 23a to 23c (P31, P32, Q31, or P32, P34, Q32) and notifies the port controller 101 of the failure information. The port controller 101 switches the operating state of the port P31, P33 in accordance with the notification.

The monitoring section 300 exemplifies a first monitoring section and a second monitoring section. The monitoring section 300 transmits and receives the OAM frames through the port P31, P33 based on the MAC address set in advance, thereby monitoring the communication path R2, R3 between the monitoring section 300 and the destination layer 2 switch 1a. For example, when the destination address of the OAM frames is coincident with its own MAC address, the monitoring section 300 receives the OAM frames and transmits its own MAC address by inserting its own MAC address into a source address of the OAM frames. In this way, the monitoring section 300 (MEP #31) of the layer 2 switch 3a monitors the communication path R2, and the monitoring section 300 (MEP #32) of the layer 2 switch 3b monitors the communication path R3.

For example, the monitoring section 300 periodically transmits/receives the CCM frames to/from the MEP #11 of the destination layer 2 switch 1a, thereby monitoring the communication path R1, R2, R3.

Figure 7:
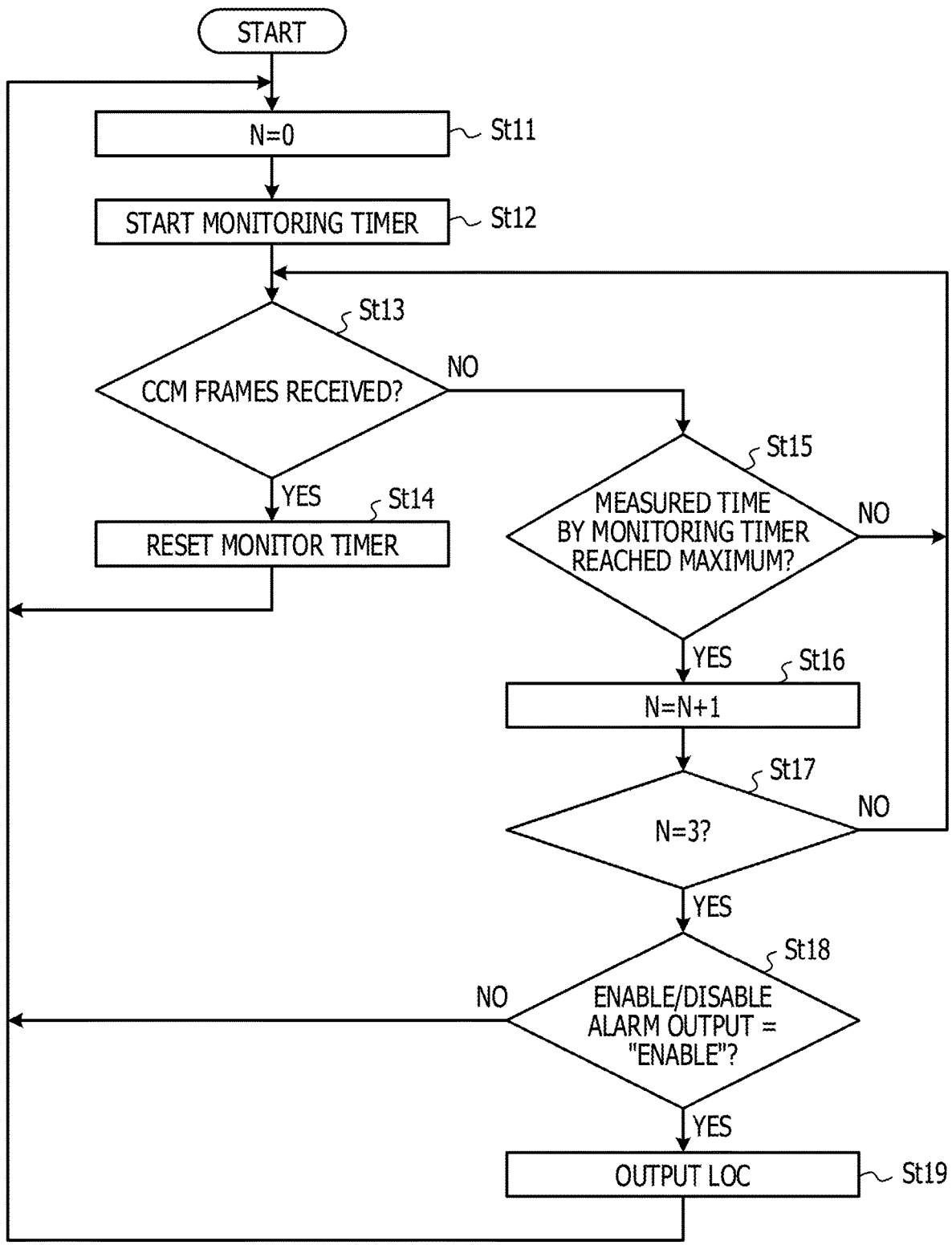
FIG. 7 is a flowchart illustrating an example of monitoring processing performed on a communication path by using the CCM frames.

FIG. 7 is a flowchart illustrating an example of monitoring processing performed on the communication path R1, R2, R3 by using the CCM frames. The monitoring section 300 performs this processing after the startup processing of the layer 2 switches 3a, 3b has been performed.

The monitoring section 300 sets to 0 a number of times N of the absence of the reception of the CCM frames (step St11). Next, the monitoring section 300 starts a monitoring timer (step St12). Next, the monitoring section 300 determines whether the monitoring section 300 has received the CCM frames (step St13). When the monitoring section 300 has received the CCM frames (Yes in step St13), the monitoring timer is reset (step St14). After that, the various types of the processing in and after step St11 are performed again.

When the monitoring section 300 has not received the CCM frames (No in step St13), whether the measured time by the monitoring timer has reached its maximum value is determined (step St15). When the measured time by the monitoring timer has not reached the maximum value (No in step St15), the monitoring section 300 performs the various types of the processing in and after step St13 again.

When the measured time by the monitoring timer has reached the maximum value (Yes in step St15), the monitoring section 300 adds 1 to the number of times N of the absence of the reception (N=N+1) (step St16). Next, the monitoring section 300 determines whether the number of times N of the absence of the reception reaches 3 (step St17). When the number of times N of the absence of the reception is less than 3 (No in step St17), the monitoring section 300 performs the various types of the processing in and after step St13 again.

When the number of times N of the absence of the reception reaches 3 (Yes in step St 17), the monitoring section 300 determines whether the setting of the enable/disable alarm output illustrated in FIG. 3 is "enable" or "disable" (step St 18). When the setting of the enable/disable alarm output is "enable" (Yes in step St18), the monitoring section 300 outputs the LOC as an alarm (step St19). After that, the various types of the processing in and after step St11 are performed again.

When the setting of the enable/disable alarm output is "disable" (No in step St18), the monitoring section 300 performs the various types of processing in and after step St11 again without outputting the LOC. Thus, the monitoring processing is performed.

As described above, when the setting of the enable/disable alarm output is "disable", the monitoring section 300 (MEP #31, #32) does not output the alarm.

The monitoring section 300 periodically transmits the CCM frames to the destination layer 2 switch 1a.

Figure 8:
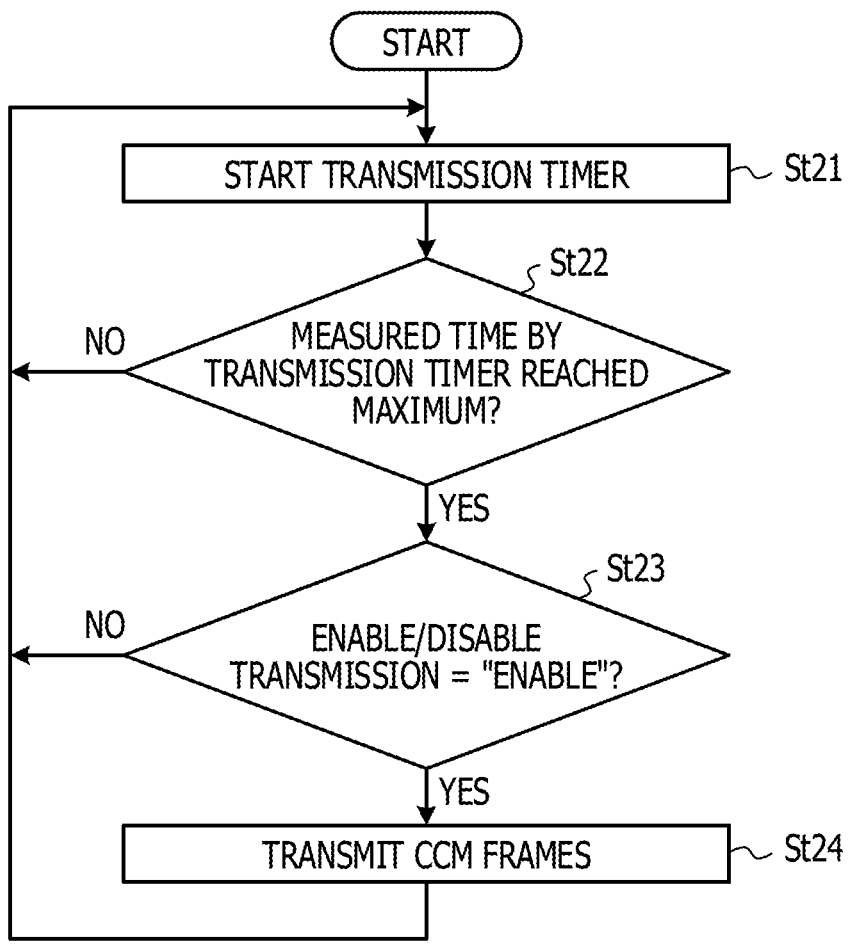
FIG. 8 is a flowchart illustrating an example of transmission processing of the CCM frames.

FIG. 8 is a flowchart illustrating an example of transmission processing of the CCM frames. The monitoring section 300 performs this processing after the startup processing of the layer 2 switches 3a, 3b has been performed.

The monitoring section 300 starts a transmission timer (step St21). Next, the monitoring section 300 determines whether the measured time by the transmission timer reaches its maximum value (step St22). When the measured time of the transmission timer has not reached the maximum value (No in step St22), the monitoring section 300 performs the various types of the processing in and after step St21 again.

When the measured time of the transmission timer has reached the maximum value (Yes in step St22), the monitoring section 300 determines whether the setting of the enable/disable transmission illustrated in FIG. 3 is "enable" or "disable" (step St23). When the setting of the enable/disable transmission is "enable" (Yes in step St23), the monitoring section 300 transmits the CCM frames through the port P31, P33 (step St24). After that, the various types of the processing in and after step St21 are performed again.

When the setting of the enable/disable transmission is "disable" (No in step St23), the monitoring section 300 performs the various types of processing in and after step St21 again without transmitting the CCM frames.

As described above, when the setting of the enable/disable transmission is "disable", the monitoring section 300 (MEP #31, #32) does not output the CCM frames.

Referring back to FIG. 5, the MEP controller 301 controls the settings of the monitoring section 300 (see FIG. 3) in accordance with the operating state (ACT/SBY) of the port P31, P33. When the operating state of the port P31 is switched to the standby state, the MEP controller 301 of the layer 2 switch 3a restricts the monitoring of the communication path R2 by the monitoring section 300. When the operating state of the port P33 is switched to the standby state, the MEP controller 301 of the layer 2 switch 3b restricts the monitoring of the communication path R3 by the monitoring section 300. The MEP controller 301 exemplifies a first controller and a second controller.

Thus, when the operating state of the port P31, P33 of the device in which the MEP controller 301 is included are switched to the standby state, the MEP controller 301 may suppress influence on the monitoring of the communication path R2, R3 after the switching regardless of the fact that the common MAC address is set in the monitoring section 300 (MEP #31, #32). The MEP controller 301 changes the setting of the MEP #31, #32 in accordance with the switching of the communication path R1 when the link failure is generated.

Figure 9:
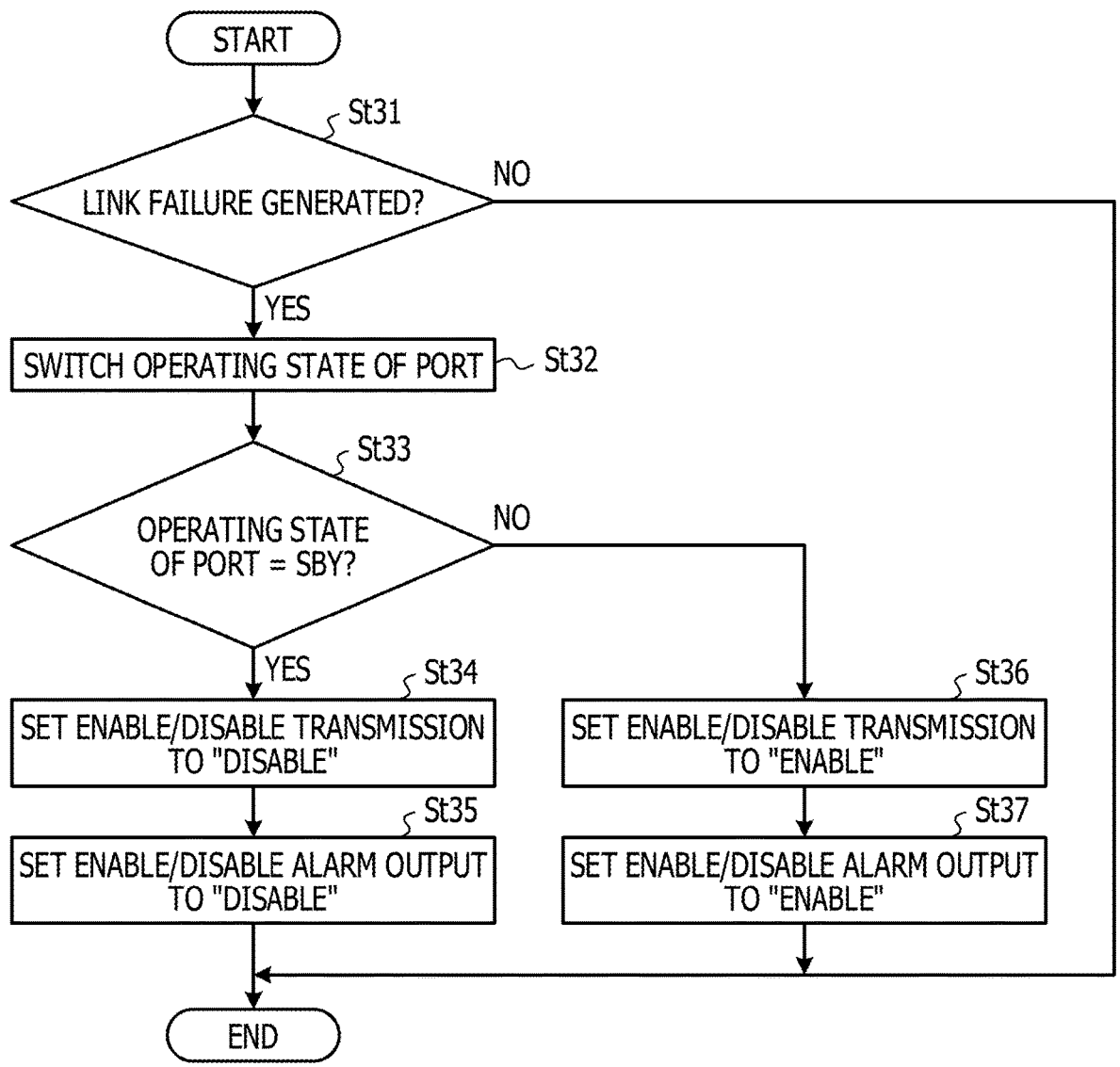
FIG. 9 is a flowchart illustrating an example of setting change processing of the MEP.

FIG. 9 is a flowchart illustrating an example of setting change processing of the MEP #31, #32. The failure detecting section 302 obtains failure information from the ports 23a to 23c so as to determine whether a link failure has been generated (step St31). When no link failure has been generated (No in step St31), this processing ends.

When a link failure has been generated (Yes in step St31), the port controller 101 switches the operating state of the port P31, P33 to the active state or the standby state (step St32). This switches the communication path R1 to the communication path R2 or R3.

Next, the MEP controller 301 obtains information on the operating state of the port P31, P33 from the port controller 101 so as to determine whether the operating state of the port P31, P33 is the active (ACT) state or the standby (SBY) state (step St33).

When the operating state of the port P31, P33 is the standby state (Yes in step St33), the MEP controller 301 sets the enable/disable transmission of the MEP #31, #32 to "disable" (step St34) and sets the enable/disable alarm output of the MEP #31, #32 to "disable" (step St35).

As described above, when the operating state of the port P31, P33 is switched to the standby state, the MEP controller 301 causes the monitoring section 300 to stop the alarm output caused by the absence of the reception of the CCM frames. For example, the MEP controller 301 sets the enable/disable alarm output of the monitoring section 300 of the device in which the MEP controller 301 is included in accordance with the communication path R2, R3 after the switching, thereby output of false alarms may be reduced.

For example, when the communication path R1 is switched to the communication path R2, the enable/disable alarm output of the MEP #32 that does not exist on the communication path R2 is set to "disable", and when the communication path R1 is switched to the communication path R3, the enable/disable alarm output of the MEP #31 that does not exist on the communication path R3 is set to "disable". As a result, when the MEP #31, #32 does not exist on the communication path R3, R2, the LOC is not output to the network administration device 90 even in the case where the CCM frames are not received. This may allow the network administration device 90 to save a load for processing for masking the LOC.

When the operating state of the port P31, P33 is switched to the standby state, the MEP controller 301 causes the monitoring section 300 to stop transmission of the CCM frames. For example, the MEP controller 301 sets the enable/disable transmission, of the CCM frames, of the monitoring section 300 of the device in which the MEP controller 301 is included in accordance with the communication path R2, R3 after the switching, thereby double transmission of the CCM frames may be reduced.

For example, when the communication path R1 is switched to the communication path R2, the enable/disable transmission of the MEP #32 that does not exist on the communication path R2 is set to "disable", and when the communication path R1 is switched to the communication path R3, the enable/disable transmission of the MEP #31 that does not exist on the communication path R3 is set to "disable". As a result, when the MEP #31, #32 does not exist on the communication path R3, R2, the CCM frames are not transmitted to the relay network 93. This may reduce double transmission caused due to transmission of the CCM frames by both the MEPs #31, #32.

When the operating state of the port P31, P33 is the active state (No in step St33), the MEP controller 301 sets the enable/disable transmission of the MEP #31, #32 to "enable" (step St36) and sets the enable/disable alarm output of the MEP #31, #32 to "enable" (step St37).

As described above, when the operating state of the port P31, P33 is switched to the active state, the MEP controller 301 cancels the restriction of the monitoring of the communication paths R2, R3 by the monitoring section 300. For example, the MEP controller 301 sets the enable/disable transmission and the enable/disable alarm output of the monitoring section 300 of the device in which the MEP controller 301 is included in accordance with the communication path R2, R3 after the switching, thereby allowing the communication path R2, R3 to be monitored.

For example, when the communication path R1 is switched to the communication path R2, the enable/disable transmission and the enable/disable alarm output of the MEP #31 that exists on the communication path R2 are set to "enable", and when the communication path R1 is switched to the communication path R3, the enable/disable transmission and the enable/disable alarm output of the MEP #32 that exists on the communication path R3 are set to "enable". In this way, even when the enable/disable transmission and the enable/disable alarm output of the MEP #31, #32 are once set to "disable", the monitoring of the communication path R2, R3 is able to be restarted by switching to the communication path R2, R3 afterward.

The setting change processing of the MEPs #31, #32 is performed as has been described.

As has been described, the synchronization processing section 100 of each of the layer 2 switches 3a, 3b sets the common MAC address in the monitoring section 300. The monitoring section 300 of the layer 2 switch 3a, 3b transmits and receives the OAM frames through the port P31, P33 based on the MAC address set in advance, thereby monitoring the communication path R2, R3 between the monitoring section 300 and the destination layer 2 switch 1a.

Thus, the monitoring section 300 is able to receive the OAM frames regardless of whether the communication path after the switching is R2 or R3. Accordingly, it is not required to set the MAC address in the monitoring sections 300 in accordance with the communication path R2, R3 after the switching.

When the operating state of the port P31, P33 is switched to the standby state, the MEP controller 301 restricts the monitoring of the communication path R2, R3 by the monitoring section 300. Thus, when the operating state of the port P31, P33 of the device in which the MEP controller 301 is included is switched to the standby state, the MEP controller 301 may suppress influence on the monitoring of the communication path R2, R3 after the switching regardless of the fact that the common MAC address is set in the monitoring section 300.

Thus, according to the present embodiment, the monitoring of the communication path R2, R3 may be able to be quickly restarted after the switching of the communication path R1.

The above-described embodiment is a preferred exemplary embodiment. The embodiment is not limited to the above-described embodiment and is able to be implemented by being changed in a variety of manners without departing from the gist of the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device comprising:
   a first port configured to be set with a first MAC address as a monitoring point, the first port being connected to one communication line belonging to a link aggregation group to which another communication line for another device also belongs; and a processor configured to:

set the first MAC address in the first port such that the first MAC address is identical to a second MAC address which is set as a monitoring point in a second port of the other device connected to the other communication line belonging to the link aggregation group to which the one communication line belongs;

transmit and receive a monitoring frame through the first port by using the first MAC address, the monitoring frame addressed to the first MAC address being a frame controlled to arrive at both of the first port set with the first MAC address and the second port set with the second MAC address;

switch an operating state of the first port to an active state or a standby stated; and restrict the transmission and the reception of the monitoring frame through the first port when the operating state of the first port is switched to the standby state, wherein the switching of the operating state leads not to change of the first MAC address in the first port.

2. The communication device according to claim 1, wherein the processor further configured to stop output of an alarm generated due to an absence of the reception of the monitoring frame when the operating state of the first port is switched to the standby state.

3. The communication device according to claim 1, wherein the processor further configured to stop the transmission of the monitoring frame when the operating state of the first port is switched to the standby state.

4. The communication device according to claim 1, wherein the processor further configured to cancel the restriction of the transmission and the reception of the monitoring frame for a first communication path when the operating state of the first port is switched to the active state.

5. The communication device according to claim 1, wherein the processor further configured to set in the first port an address held by the communication device or an address held by the other device in accordance with a result of communication with the other device.

6. A communication method comprising:

setting a first MAC address as a monitoring point in a first port connected to one communication line belonging to a link aggregation group to which another communication line for another device also belongs, the setting of the first MAC address being configured to set the first MAC address such that the first MAC address is identical to a second MAC address which is set as a monitoring point in a second port of the other device connected to the other communication line belonging to the link aggregation group to which the one communication line belongs;

transmitting and receiving a monitoring frame through the first port by using the first MAC address, the monitoring frame addressed to the first MAC address being a frame controlled to arrive at both of the first port set with the first MAC address and the second port set with the second MAC address;

switching an operating state of the first port to an active state or a standby state; and restricting the transmission and the reception of the monitoring frame through the first port when the operating state of the first port is switched to the standby state, wherein the switching of the operating state leads not to change of the first MAC address in the first port.

7. A communication system comprising:

a first communication device and a second communication device that respectively perform communication through a first communication line and a second communication line that belong to a single link aggregation group, the first communication device being configured to:

set a first MAC address as a monitoring point in a first port connected to the first communication line, the setting of the first MAC address being configured to set the first MAC address such that the first MAC address is identical to a second MAC address which is set as a monitoring point in a second port of the second communication device;

transmit and receive a first monitoring frame through the first port by using the first MAC address, the first monitoring frame addressed to the first MAC address being a frame controlled to arrive at both of the first port set with the first MAC address and the second port set with the second MAC address;

switch an operating state of the first port to an active state or a standby stated; and restrict the transmission and the reception of the first monitoring frame through the first port when the operating state of the first port is switched to the standby state, the second communication device being configured to:

set a second MAC address as a monitoring point in a second port connected to the second communication line, the setting of the second MAC address being configured to set the second MAC address such that the second MAC address is identical to the first MAC address;

transmit and receive a second monitoring frame through the second port by using the second MAC address, the second monitoring frame addressed to the second MAC address being a fame controlled to arrive at both of the first port set with the first MAC address and the second port set with the second MAC address;

switch an operating state of the second port to an active state or a standby state; and restrict the transmission and the reception of the second monitoring frame through the second port when the operating state of the second port is switched to the standby state, and wherein the switching of the operating state of the first port and the switching of the operating state of the second port lead not to change of the first MAC address and the second MAC address.

* * * * *